INVENTOR.
CHARLES T. BUTTON

Aug. 21, 1956     C. T. BUTTON     2,760,093
ELECTRIC GENERATOR
Filed May 7, 1953     2 Sheets-Sheet 2
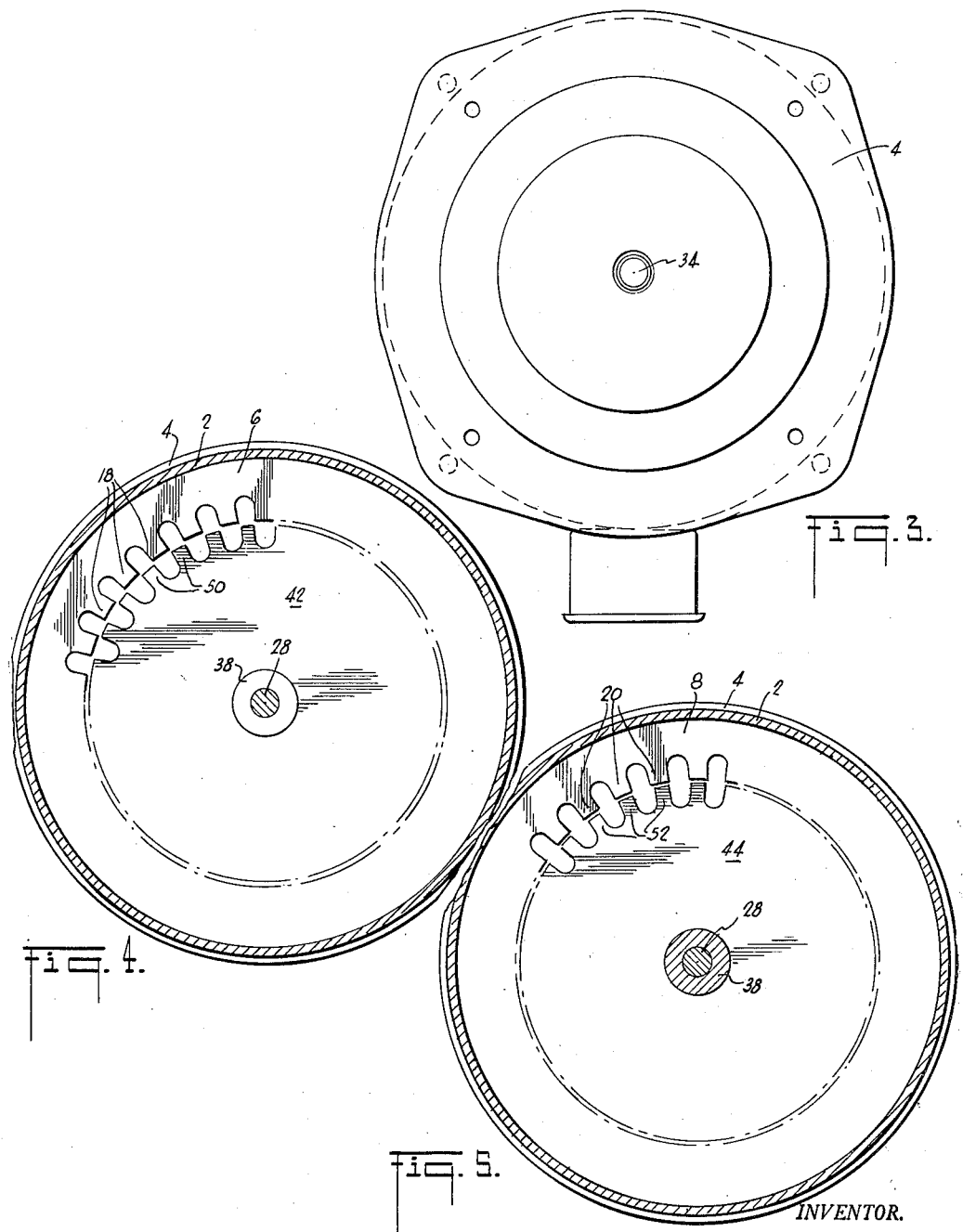
INVENTOR.
CHARLES T. BUTTON
BY James and Franklin
ATTORNEYS

United States Patent Office 2,760,093
Patented Aug. 21, 1956

2,760,093

ELECTRIC GENERATOR

Charles T. Button, Needham, Mass., assignor to National Pneumatic Co., Inc., Boston, Mass., a corporation of Delaware Application May 7, 1953, Serial No. 353,570

2 Claims. (Cl. 310—155)

The present invention relates to an electric generator of simplified construction.

In many installations, and particularly those in remote and in inaccessible places, an extremely reliable source or generator of electric power is required. The simpler the structure of such a generator, the less susceptible it is to breakdown and hence the more suited it is to installations of the type in question. It is the prime object of the present invention to produce a sturdy and simple alternator which, when once installed, is capable of operating over extended periods of time without requiring any supervision, adjustment or repair.

For example, it has been proposed to provide communications relay stations for television transmissions or the like, many of these stations being located atop mountains in order to obtain maximum transmission range. The stations are designed to be fully self-sustaining and, because of their generally inaccessible location, must be capable of functioning reliably for long intervals without supervision. The actual power consumption of such stations will be fairly small, but if they are to operate over any extended period of time a generator of electric energy must be provided. Since exposed mountain peaks are almost always subjected to fairly high winds, wind power can be utilized to drive the generator and produce the electrical power needed to operate the relay station. The generator of the present invention has been specifically designed for that purpose. It is characterized by a maximum of simplicity in construction, by the lack of any sliding electrical contacts, and by a construction which generates a voltage of appreciably high frequency in a unitary winding even though the rotor of the generator is moved at a fairly low rate.

Essentially, the generator structure of the present invention provides for the induction in an electrical coil of an alternating voltage by causing a magnetic flux to cut across the coil in one direction and then the other. To this end the coil is mounted between a pair of toothed elements of high magnetic permeability, other elements having opposed teeth being rotated with respect thereto and being so connected in a magnetic circuit that the path of greatest permeability, and hence the path which the magnetic flux will take, will alternately shift from one side of the coil to the other and back again, the magnetic field thus cutting the coil and inducing an alternating voltage therein. This action of the magnetic field is produced by rotationally staggering the opposed sets of teeth on the rotor and stator respectively so that when one opposed set of teeth are in registration, thus defining a small air gap and a path of high permeability therebetween, the other opposed set of teeth are out of registration, thus defining a large air gap and hence a path of low permeability therebetween. As the rotor rotates, the first mentioned set of teeth move out of registration while the second mentioned set of teeth move into registration. The location of the high permeability path for the magnetic field thus shifts from one side of the coil to the other, cutting the coil and inducing a voltage therein. As the rotor turns further, the initially described situation is re-established, the magnetic field then shifting to the first side of the coil and inducing in the coil a voltage of opposite polarity to that first induced. This sequence continues as the rotor turns. By providing a large number of teeth on the rotor and stator respectively, a high frequency current will be generated in a single coil even though the rotor may move fairly slowly.

In the embodiment here specifically illustrated, two groups of coils and cooperating pairs of opposed sets of rotor and stator teeth are provided, one group at each end of the generator. In this way a single generator can supply two independent voltages. The construction of the present invention is such that by proper design of these two groups of cooperating elements various phase relationships between voltages of the same frequency can be produced, or two separate voltages of entirely different frequencies may be produced, this being indicative of the ease with which the generator of the present invention can be adapted to diverse circuit installation requirements.

To the accomplishment of the above, and to such other objects as may hereinafter appear, the present invention relates to the construction of an electric generator as defined in the following claims and as described in this specification, taken together with the accompanying drawings, in which:

Fig. 3 is an end view of the generator of Fig. 1;

Fig. 4 is a cross sectional view taken along the line 4—4 of Fig. 1; and

Fig. 5 is a cross sectional view taken along the line 5—5 of Fig. 1.

Figures 1, 2:
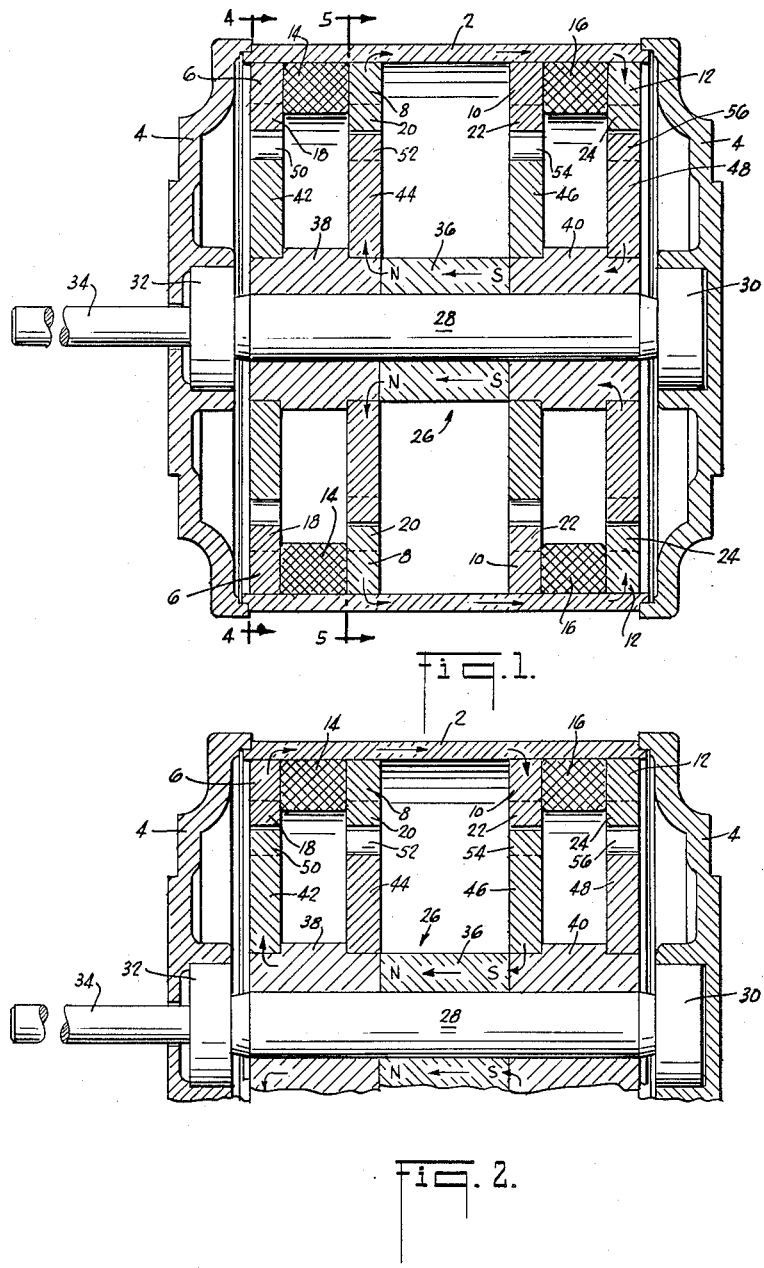
Fig. 1 is a cross sectional view of a two-phase generator constructed according to the present invention and showing the parts in one relative rotational position.
Fig. 2 is a fragmentary view similar to Fig. 1 but showing the parts in another relative rotational position.

The stationary part of the generator comprises a shell 2 of any suitable highly magnetically permeable material such as soft iron to which end caps 4 are secured in any appropriate manner, the end caps in the form of the present invention specifically disclosed preferably being formed of some suitable non-magnetically permeable material such as aluminum. Mounted on the inside of the shell 2 at each end thereof are a pair of rings 6, 8, 10 and 12 of magnetically permeable material, a wire coil 14 being positioned between the rings 6 and 8 and a wire coil 16 being positioned between the rings 10 and 12, the rings 6, 8, 10 and 12 being appropriately axially spaced from one another to that end, and so as to provide an appreciable space between the rings 8 and 10. The radially inwardly facing surfaces of the rings 6—12 are provided with a plurality or set of inwardly projecting and equally spaced teeth or projections 18, 20, 22 and 24 respectively, each defining a salient pole. Each of the rings 6 and 8, defining one extreme pair of rings, preferably have the same number of projections 18 and 20 respectively as the other, and each of the rings 10 and 12, defining another extreme pair of rings, preferably each have the same number of projections 22 and 24 respectively as the other. In the form here specifically disclosed, all of the rings have the same number of projections, to wit, thirty-two.

The rotor, generally designated 26, is mounted on shaft 28 of stainless steel or other material having low magnetic permeability, the shaft being rotationally mounted in bearings 30 and 32 supported in the end caps 4 and having a projecting part 34 which extends out beyond one of the end caps 4 so that the rotor 26 may be driven by mechanical power applied thereto. The rotor comprises a ring-shaped permanent magnet 36 of Alnico or other suitable magnetic material so oriented that the magnetic poles thereof are axially oriented with respect to the shaft 28. The axial ends of the permanent magnet 36 bear against bushings 38 and 40 of highly magnetically permeable material, each of those bushings carrying a pair of spaced rings 42, 44 and 46, 48 respectively, each highly magnetically permeable, each positioned concentrically with respect to a stator ring 6, 8, 10 and 12, and each having a plurality or set of equally spaced teeth or projections 50, 52, 54 and 56, each defining a salient pole, the radially outwardly facing tips of which are concentric with and rotate closely within the projections 18, 20, 22 and 24 respectively on the stator.

The number of rotor projections 50 and 52 in each set of projections on the rotor rings 42 and 44 respectively are preferably equal in number to the stator projections 18 and 20 in each set of projections on the stator rings 6 and 8, and the projections 54 and 56 in each set of projections on the rotor rings 46 and 48 respectively are preferably equal in number to the stator projections 22 and 24 in each set of projections on the stator rings 10 and 12.

There is therefore, at each end of the generator two pairs of cooperating or opposed sets of projections, said pairs being defined at the left hand end of the generator as viewed in Fig. 1 by the projection sets 18, 50 and the projection sets 20, 52 respectively, and at the right hand end of the generator as viewed in Fig. 1 by the projection sets 22, 54 and the projection sets 24, 56 respectively.

In the form here specifically disclosed, the projections 18 and 20 on the stator rings 6 and 8 are similarly rotationally positioned so that each is in line with the other when viewed in the direction of the axis of the rotor shaft 28. The projections 50 and 52 on the rotor rings 42 and 44 respectively are, however, rotationally staggered or offset with respect to one another so that the projections 50 are in line with the spaces between the projections 52, when viewed in the direction of the rotor shaft 28. A similar relationship exists with respect to the stator projections 22, 24 and the rotor projections 54, 56 at the right hand end of the generator.

Having reference now only to the structure at the left hand end of the generator, it will be noted that both rotor rings 42 and 44 and their respective projections 50 and 52 will always have a given magnetic polarity, here shown as a north polarity. Assuming a magnetically permeable return path from the stator shell 2 to the south pole of the magnet 36, and with the rotor in the position shown in Fig. 1, it will be seen from the arrows in that figure that practically all of the magnetic flux from the magnet 36 will pass through the rotor ring 44, its projections 52, the narrow air gap between the rotor projections 52 and the stator projections 20, and then through the stator projections 20, the stator ring 8 and the stator shell 2 back to the south pole of the magnet. Practically no flux will pass through the rotor ring 42 and the stator ring 6 because of the large air gap which exists between them by reason of the fact that the rotor projections 50 are out of registration with the stator projections 18. Therefore practically all of the magnetic flux will be to the right of the coil 14.

When the rotor is rotated for an angular distance equal to half the spacing between any given set of projections 18, 20, 50, 52, or 5⅝ degrees when there are thirty-two such projections around the circumference of a given ring 6, 8, 42, 44, the position shown in Fig. 2 will result. There the rotor projections 52 are out of registration with the stator projections 20, while the rotor projections 50 are in registration with the stator projections 18. Consequently, as indicated by the arrows in Fig. 2, the bulk of the flux from the magnet 36 will pass through the rotor ring 42 and its projections 50, across the narrow air gap between the rotor projections 50 and the stator projections 18, and then through the stator ring 6 and shell 2 back to the south pole of the magnet 36. This involves a shift of the magnetic field from the right hand side to the left hand side of the coil 14, and the magnetic field, as it moves from its position of Fig. 1 to its position of Fig. 2, will cut the wires of the coil 14 and induce a voltage therein.

On the next rotation of the rotor shaft 28 through a comparable distance, the relative positions shown in Fig. 1 will be re-established, the magnetic field will shift back to the right hand side of the coil 14, the wires of that coil will be cut in the opposite sense, and a voltage of opposite polarity will be induced therein.

If only a single voltage is to be generated, only the structure shown on the left hand end of the generator here specifically disclosed need be employed, and any suitable magnetically permeable path to complete the magnetic circuit to the south pole of the magnet 36 may be provided. In the embodiment here specifically illustrated, however, the return path to the south pole of magent 36 is defined by a structure comparable to that the operation of which has just been discussed in order to generate a second voltage, the coil 16 being utilized for that purpose. As here disclosed, the same number of projections 22, 24, 54 and 56 are utilized as was the case with the projections 18, 20, 60 and 52, the projections 22 and 44 being axially in line with one another and the projections 54 and 56 being offset or staggered with respect to one another so that the projections 56 come opposite the spaces between the projections 54 when viewed in the direction of the axis of the rotor shaft 58. Consequently the voltage generated in coil 16 will have the same frequency as the voltage generated in coil 14. It will be noted that when the projections 52 and 20 are in registration, the projections 56 and 24 are in registration (see Fig. 1) while when the projections 50 and 18 are in registration the projections 54 and 22 are in registration (see Fig. 2). In this way the length of the path of the magnetic flux is made substantially constant, and hence the strength of the flux and the maximum value of the generated voltage is maintained substantially constant. This particular type of construction is employed when two generated voltages are desired. As here shown the phase of the current in coil 14 is 180 degrees out from the phase of the coil generated in the coil 16. The exact phase relationship can be controlled by the relative rotational positions of the extreme right hand pairs of opposed sets of projections 22, 54, 24, 56 with respect to the extreme left hand pairs of opposed sets of projections 18, 50, 20, 52. If voltage of different frequencies are required, this can readily be produced in the generator of the present invention by suitable choice of the numbers of projections in one extreme pair of opposed sets of projections 22, 54, 24, 56 with respect to the number of projections in the other extreme pair of opposed sets of projections 18, 50, 20, 52.

While the source of the generating magnetic field is here disclosed as a ring-shaped permanent magnet 36, this being preferred for purposes of simplicity, the invention could obviously be practiced through the use of any other appropriate magnetizing source, such as an electrically energized coil or another form of permanent magnet. While the magnetizing means 36 is located on the rotor 26 and the coils 14 and 16 are positioned on the stator, it is obvious that the positions of these members could be reversed, and both could even be mounted together on the rotor or stator.

The structure of the present invention is exceedingly simple and sturdy. There are no sliding contacts to constitute possible sources of malfunction. By reason of the novel arrangement of projections or teeth defining salient poles in conjunction with the positioning of a coil in which electric energy is to be generated, substantially all of the magnetic flux existing in the generator is caused to cut that coil a number of times for each revolution of the rotor. Only a single winding need be employed for the production of a high frequency voltage even though the rotor may be turned at a comparatively low speed. The design is such that two voltages of the same or different phase or frequency can be produced in the same machine.

While but a single embodiment of the present invention is here disclosed, it will be apparent that many variations may be made therein within the scope of the present invention as defined in the following claims.

I claim:

1. A generator comprising a cylindrical shell of magnetizable material, a fixed pair of axially spaced rings of magnetic material within said shell, each of said rings having a set of circumferentially spaced inward radial projections substantially concentric with said shell, a rotor rotationally mounted within said shell and comprising a pair of axially spaced rotatable rings of magnetizable material on said rotor, each opposite one of said fixed rings and each having a set of circumferentially spaced outward radial projections substantially concentric with said shell, a magnetizing means operatively mounted on one of said rotor and said shell, magnetizable structure between said magnetizing means and said rings whereby the radial projections on the rings on said shell have a given magnetic polarity and the radial projections on the rings on said rotor have the opposite magnetic polarity, and a coil substantially concentric with said shell between the rings of one of said pairs of rings, the projections on each pair of fixed and rotatable rings opposite one another being so rotationally positioned that when the projections of one such pair are in registration the projections of the other such pair are out of registration.

2. A generator comprising a cylindrical shell of magnetizable material, a first pair of fixed axially spaced rings of magnetic material within said shell, a second pair of fixed axially spaced rings of magnetic material within said shell and axially spaced from said first pair of fixed rings, a rotor rotationally mounted within said shell and comprising a first pair of axially spaced rotatable rings of magnetic material, each opposite one of said first pair of fixed rings and each having a set of circumferentially spaced outward radial projections substantially concentric with said shell, a second pair of axially spaced rotatable rings of magnetizable material each opposite one of said second pair of fixed rings and each having a set of circumferentially spaced outward radial projections substantially concentric with said shell, a magnetizing means operatively mounted on one of said rotor and said shell between the first and second pairs of rings thereon, the poles of said magnetizing means being oriented toward said pairs of rings respectively, magnetizable structure between the rings of each pair and closing the magnetic circuit from one pole of said magnetizing means through the corresponding pairs of rings to the other pole of said magnetizing means, a first coil substantially concentric with said shell between one pair of rings to one side of said magnetizing means, and a second coil substantially concentric with said shell between a pair of rings on the other side of said magnetizing means, the projections of each pair of opposed fixed and rotatable rings on each side of said magnetizing means being so rotationally positioned that when the projections of one such pair are in registration the projections of the other such pair on the same side of said magnetizable means are out of registration.

References Cited in the file of this patent

UNITED STATES PATENTS

| | | |
|---|---|---|
| 1,238,534 | Le Pontois | Aug. 28, 1917 |
| 1,477,271 | Lowenstein | Dec. 11, 1923 |
| 2,103,165 | Merrill | Dec. 21, 1937 |
| 2,516,380 | Goldschmidt | July 25, 1950 |
| 2,651,734 | Field | Sept. 8, 1953 |

FOREIGN PATENTS

| | | |
|---|---|---|
| 6,838 | Great Britain | of 1906 |
| 272,472 | Great Britain | Apr. 26, 1928 |